(12) United States Patent
Haraguchi et al.

(10) Patent No.: US 8,027,271 B2
(45) Date of Patent: Sep. 27, 2011

(54) COMMUNICATING APPARATUS AND CONTROLLING METHOD OF THEREOF

(75) Inventors: Masahiko Haraguchi, Fukuoka (JP); Noriaki Kido, Fukuoka (JP)

(73) Assignee: Panasonic Corporation, Osaka (JP)

( * ) Notice: Subject to any disclaimer, the term of this patent is extended or adjusted under 35 U.S.C. 154(b) by 421 days.

(21) Appl. No.: 11/755,435

(22) Filed: May 30, 2007

(65) Prior Publication Data

US 2007/0280274 A1 Dec. 6, 2007

(30) Foreign Application Priority Data

May 30, 2006 (JP) .................................. 2006-149196
Jun. 20, 2006 (JP) .................................. 2006-170033

(51) Int. Cl.
H04L 12/28 (2006.01)
(52) U.S. Cl. ...................................... 370/254; 370/401
(58) Field of Classification Search .................. None
See application file for complete search history.

(56) References Cited

U.S. PATENT DOCUMENTS

| | | | | |
|---|---|---|---|---|
| 6,028,848 A * | 2/2000 | Bhatia et al. .................. | 370/257 |
| 6,393,386 B1 * | 5/2002 | Zager et al. .................. | 370/254 |
| 6,452,908 B1 * | 9/2002 | Yamada et al. ............... | 370/256 |
| 6,532,217 B1 * | 3/2003 | Alkhatib et al. .............. | 370/252 |
| 6,591,306 B1 | 7/2003 | Redlich | |
| 6,826,611 B1 * | 11/2004 | Arndt ........................... | 370/252 |
| 6,857,009 B1 | 2/2005 | Ferreria | |
| 6,865,613 B1 * | 3/2005 | Millet et al. .................. | 370/401 |
| 6,901,395 B2 * | 5/2005 | Andrus et al. ................. | 370/381 |
| 6,928,485 B1 * | 8/2005 | Krishnamurthy et al. .... | 709/242 |
| 7,127,447 B2 * | 10/2006 | Andrus et al. ................. | 709/247 |
| 7,152,099 B1 * | 12/2006 | Arens ........................... | 709/220 |
| 7,219,160 B1 * | 5/2007 | Buchsbaum et al. ......... | 709/242 |
| 7,245,618 B2 * | 7/2007 | Ito et al. ........................ | 370/392 |
| 7,281,036 B1 * | 10/2007 | Lu et al. ........................ | 709/220 |
| 7,296,089 B2 * | 11/2007 | Krishnamurthy et al. .... | 709/238 |
| 7,313,102 B2 * | 12/2007 | Stephenson et al. .......... | 370/254 |
| 7,317,693 B1 * | 1/2008 | Roesch et al. ................ | 370/252 |
| 7,400,591 B2 * | 7/2008 | Brawn et al. .................. | 370/254 |
| 7,577,670 B2 * | 8/2009 | Ho et al. ........................ | 1/1 |
| 2003/0110240 A1 | 6/2003 | Lockridge et al. | |
| 2003/0115367 A1 * | 6/2003 | Ohara ........................... | 709/249 |
| 2004/0017814 A1 * | 1/2004 | Shimada .................... | 370/395.52 |
| 2005/0232165 A1 * | 10/2005 | Brawn et al. .................. | 370/255 |

FOREIGN PATENT DOCUMENTS

JP 2001057572 2/2001
JP 2005513832 5/2005

* cited by examiner

Primary Examiner — Chirag Shah
Assistant Examiner — Joshua Smith
(74) Attorney, Agent, or Firm — Dickinson Wright PLLC

(57) ABSTRACT

A communicating apparatus for relaying a data communication between a first network and a second network, includes a receiving unit having an interface for a first network connection and serving to receive a packet from a terminal connected to the first network; and a control processor that acquires an IP address of the terminal from the packet received by the receiving unit, obtains a range of a subnet mask value which can be taken by the terminal based on the IP address, obtains a candidate for a host address corresponding to each subnet mask value, sets the host address candidate accessibly from the terminal, determines an estimated value of the subnet mask value of the terminal based on a state of the packet which is received from the terminal and is transmitted to the host address candidate, and sets the estimated value as a subnet mask value corresponding to an interface for the first network connection.

21 Claims, 18 Drawing Sheets

FIG. 7

Figure 1:
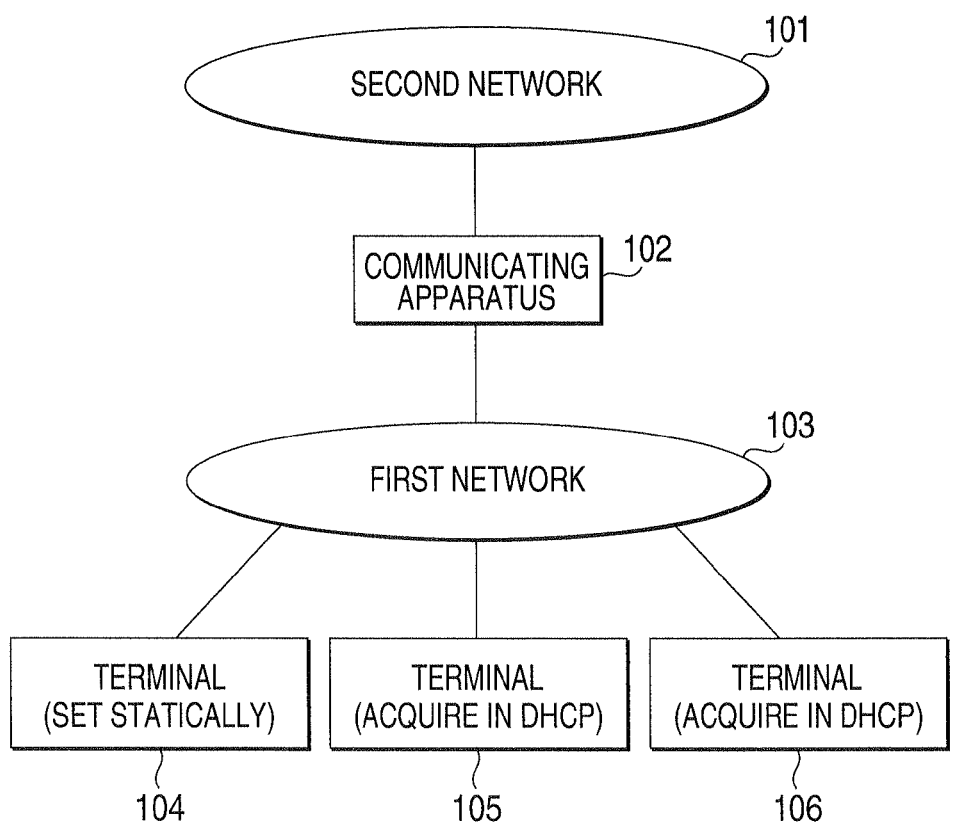

| IP ADDRESS | ARP RECEIVING FLAG | DESTINATION IP ADDRESS FLAG |
|---|---|---|
| 10.2.2.1 | ○ | |
| 10.2.2.12 | ○ | ○ |
| 210.1.2.3 | | ○ |

FIG. 8

| IP ADDRESS | ARP RECEIVE | DESTINATION IP ADDRESS |
|---|---|---|
| 10.2.2.1 | ○ | |
| 10.2.2.12 | ○ | |
| 210.1.2.3 | | ○ |

FIG. 10

| PROTOCOL | PORT NUMBER |
|---|---|
| SMTP | 25 |
| DNS | 53 |
| HTTP | 80 |
| POP3 | 110 |
| UPnP | 1900 |

FIG. 11

| IP ADDRESS | ARP RECEIVE | PORT NUMBER |
|---|---|---|
| 10.2.2.1 | ○ | |
| 10.2.2.12 | ○ | 53 |
| 210.1.2.3 | | 80 |

FIG. 12

| IP ADDRESS | ARP RECEIVE | PORT NUMBER |
|---|---|---|
| 10.2.2.1 | ○ | 1900 |
| 10.2.2.12 | ○ | |
| 210.1.2.3 | | 80 |

FIG. 13

| IP ADDRESS | ARP RECEIVE | PORT NUMBER |
|---|---|---|
| 10. 2. 2. 1 | O | 53 |
| 10. 2. 2. 12 | O | 110 |
| 210. 1. 2. 3 | | 80 |

FIG. 14

| IP ADDRESS | ARP RECEIVE | PORT NUMBER |
|---|---|---|
| 10. 2. 2. 1 | O | |
| 10. 2. 2. 12 | O | |
| 210. 1. 2. 3 | | 80 |

FIG. 19

| NUMBER OF BITS OF MASK VALUE | NETWORK ADDRESS | NETWORK ADDRESS / HOST ADDRESS | HOST ADDRESS 1 [a11F-1] | ARP RECEIPT | HOST ADDRESS 2 [a110+1] | ARP RECEIPT |
|---|---|---|---|---|---|---|
| 8 | 10.0.0.0/8 | 0000-1010 /.[75.21.165] | 10.255.255.254 | D(24) | 10.0.0.1 | D |
| 9 | 10.0.0.0/9 | [10.]0 /100-1011.[21.165] | 10.127.255.254 | D | 10.0.0.1 | D(23) |
| 10 | 10.64.0.0/10 | [10.]01 /00-1011.[21.165] | 10.127.255.254 | D(22) | 10.64.0.1 | D |
| 11 | 10.64.0.0/11 | [10.]010 /0-1011.[21.165] | 10.95.255.254 | D(21) | 10.64.0.1 | D |
| 12 | 10.64.0.0/12 | [10.]0100- /1011.[21.165] | 10.79.255.254 | D | 10.64.0.1 | D(20) |
| 13 | 10.72.0.0/13 | [10.]0100-1 /011.[21.165] | 10.79.255.254 | D(19) | 10.72.0.1 | D |
| 14 | 10.72.0.0/14 | [10.]0100-10 /11.[21.165] | 10.75.255.254 | D | 10.72.0.1 | D(18) |
| 15 | 10.74.0.0/15 | [10.]0100-101 /1.[21.165] | 10.75.255.254 | D | 10.74.0.1 | D(17) |
| 16 | 10.75.0.0/16 | [10.]0100-1011 /.[21.165] | 10.75.255.254 | D(16) | 10.75.0.1 | D |
| 17 | 10.75.0.0/17 | [10.75.]0 /001-0101.[165] | 10.75.127.254 | D(15) | 10.75.0.1 | D |
| 18 | 10.75.0.0/18 | [10.75.]00 /01-0101.[165] | 10.75.63.254 | D(14) | 10.75.0.1 | D |
| 19 | 10.75.0.0/19 | [10.75.]000 /1-0101.[165] | 10.75.31.254 | D | 10.75.0.1 | D(13) |
| 20 | 10.75.16.0/20 | [10.75.]0001 /-0101.[165] | 10.75.31.254 | D(12) | 10.75.16.1 | D |
| 21 | 10.75.16.0/21 | [10.75.]0001-0 /101.[165] | 10.75.23.254 | D | 10.75.16.1 | D(11) |
| 22 | 10.75.20.0/22 | [10.75.]0001-01 /01.[165] | 10.75.23.254 | D(10) | 10.75.20.1 | A |
| 23 | 10.75.20.0/23 | [10.75.]0001-010 /1.[165] | 10.75.21.254 | A | 10.75.20.1 | A(9) |
| 24 | 10.75.21.0/24 | [10.75.]0001-0101 /.[165] | 10.75.21.254 | A | 10.75.21.1 | A(8) |
| 25 | 10.75.21.128/25 | [10.75.21.]1 /010-0101 | 10.75.21.254 | A(7) | 10.75.21.129 | A |
| 26 | 10.75.21.128/26 | [10.75.21.]10 /10-0101 | 10.75.21.191 | A | 10.75.21.129 | A(6) |
| 27 | 10.75.21.160/27 | [10.75.21.]101 /0-0101 | 10.75.21.191 | A(5) | 10.75.21.161 | A |
| 28 | 10.75.21.160/28 | [10.75.21.]1010 /-0101 | 10.75.21.175 | A(4) | 10.75.21.161 | A |
| 29 | 10.75.21.160/29 | [10.75.21.]1010-0 /101 | 10.75.21.167 | A | 10.75.21.161 | A(3) |
| 30 | 10.75.21.164/30 | [10.75.21.]1010-01 /01 | 10.75.21.167 | A(1) | 10.75.21.165 | A(2) |

A : ARP TRANSMISSION    D : PACKET TRANSMISSION TO DEFAULT GATEWAY

FIG. 20

| HOST IP ADDRESS CANDIDATE | ARP REQUEST | IP PACKET |
|---|---|---|
| 10. 75. 21. 254 | ○ | ○ |
| 10. 75. 21. 1 | ○ | ○ |
| 10. 75. 20. 1 | ○ | ○ |
| 10. 75. 23. 254 | × | ○ |

FIG. 21

| ORDER | HOST ADDRESS | ARP REQUEST RECEIVING RESULT |
|---|---|---|
| (1) | 10.75.21.167 | ○ |
| (2) | 10.75.21.165 | ○ |
| (3) | 10.75.21.161 | ○ |
| (4) | 10.75.21.175 | ○ |
| (5) | 10.75.21.191 | ○ |
| (6) | 10.75.21.129 | ○ |
| (7) | 10.75.21.254 | ○ |
| (8) | 10.75.21.1 | ○ |
| (9) | 10.75.20.1 | ○ |
| (10) | 10.75.23.254 | × |
| (11) | 10.75.16.1 | × |
| (12) | 10.75.31.254 | × |
| (13) | 10.75.0.1 | × |
| (14) | 10.75.63.254 | × |
| (15) | 10.75.127.254 | × |
| (16) | 10.75.255.254 | × |
| (17) | 10.74.0.1 | × |
| (18) | 10.72.0.1 | × |
| (19) | 10.79.255.254 | × |
| (20) | 10.64.0.1 | × |
| (21) | 10.95.255.254 | × |
| (22) | 10.127.255.254 | × |
| (23) | 10.0.0.1 | × |
| (24) | 10.255.255.254 | × |

COMMUNICATING APPARATUS AND CONTROLLING METHOD OF THEREOF

FIELD OF THE INVENTION

The present invention relates to a communicating apparatus such as a router provided between a first network such as LAN and a second network such as internet and serving to relay a communication between both of the networks, and a method of controlling the communicating apparatus.

BACKGROUND

For network setting of a communicating apparatus and a terminal, it is necessary to use information such as an address having integrity between segment information of a network through which they are connected to each other.

In general, the information about the network setting are previously given to the communicating apparatus and the terminal respectively or network information having an integrity are automatically given from the communicating apparatus to the terminal.

However, even if a terminal having network information which has been set and is not well known to the communicating apparatus is connected to the communicating apparatus, the integrity of the network information cannot be taken. Therefore, they cannot communicate with each other in that condition.

In order to solve the problem, a method of taking a countermeasure has been disclosed in JP-A-2001-57572 Publication.

In the method described in the Document, a communicating apparatus gives a proxy ARP (Address Resolution Protocol) response to all of ARP packets transmitted from a terminal having unknown network information, and a packet which needs to be neither received nor relayed by the communicating apparatus is also transmitted from the terminal to the communicating apparatus. Consequently, there is a problem in that a load of the communicating apparatus is unnecessarily increased.

SUMMARY

Upon receipt of a packet from a terminal to which network setting information is statically set, a communicating apparatus determines a default gateway IP address of the terminal based on a plurality of packets to be subsequently received from the terminal, and sets the determined address value as an IP address to a network interface on a side where the terminal is connected. Consequently, the communicating apparatus is recognized as a default gateway of the network to which the terminal is connected, and functions as the default gateway of the terminal without a user changing the network setting of the terminal for static network setting.

Moreover, the communicating apparatus receives a packet from a terminal to which network setting information is statically set, estimates a subnet mask value of the terminal based on the packet and sets the estimated value as a subnet mask value to a network interface on the side where the terminal is connected.

Consequently, it is possible to cause subnet mask values to be coincident with each other by the communicating apparatus and the terminal without changing the setting of the terminal in the static network setting. Thus, it is possible to avoid a communication error due to a variation in the subnet mask value.

BRIEF DESCRIPTION OF THE SEVERAL VIEWS OF DRAWING

Figure 2:
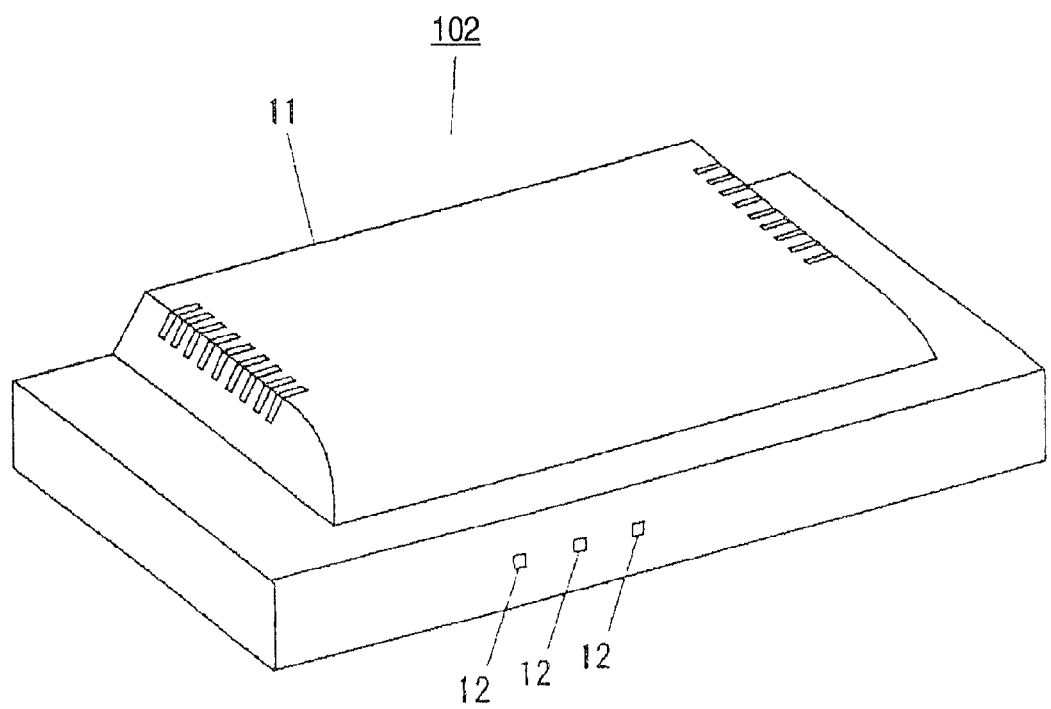
Figure 3:
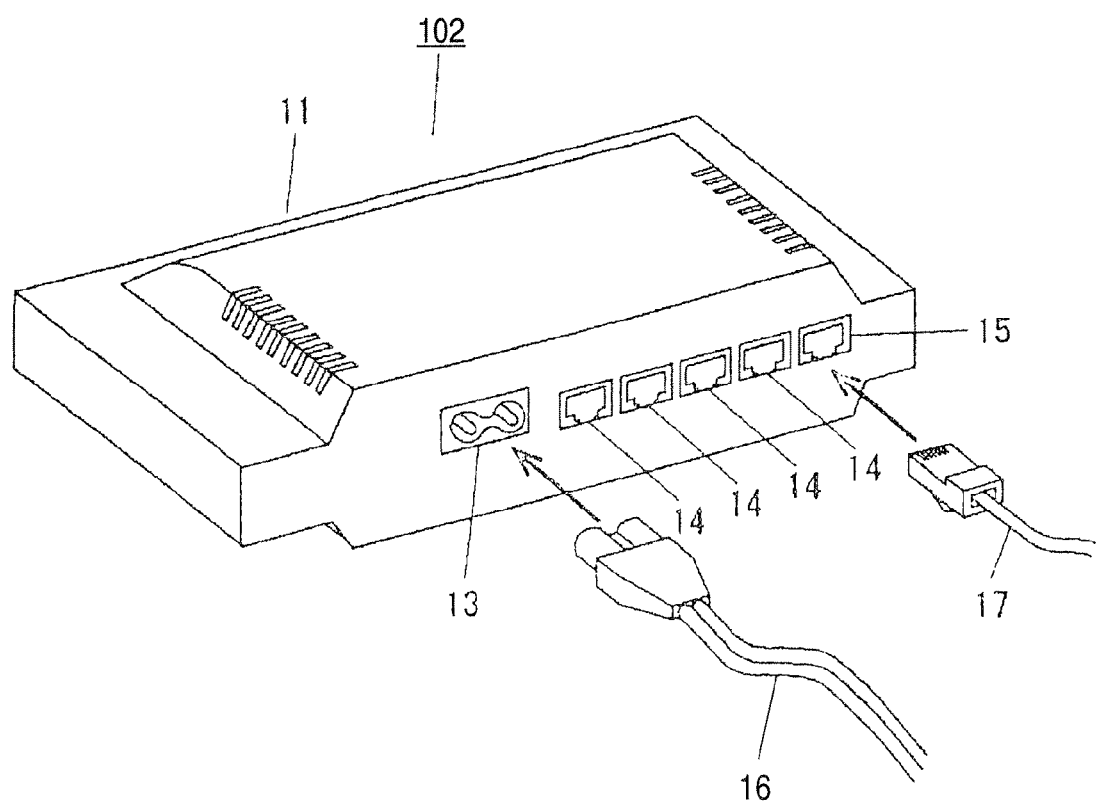
Figure 4:
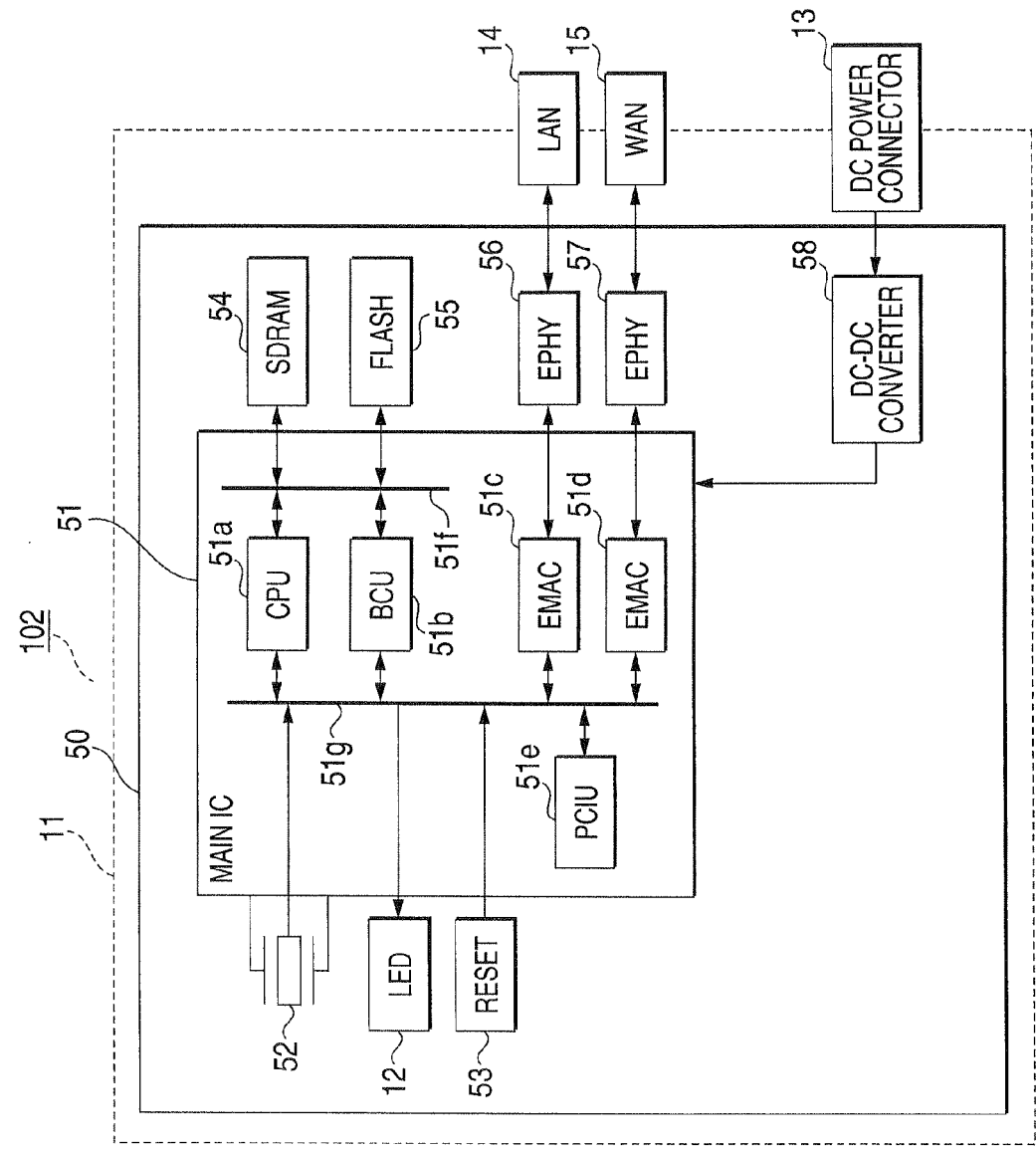
Figure 5:
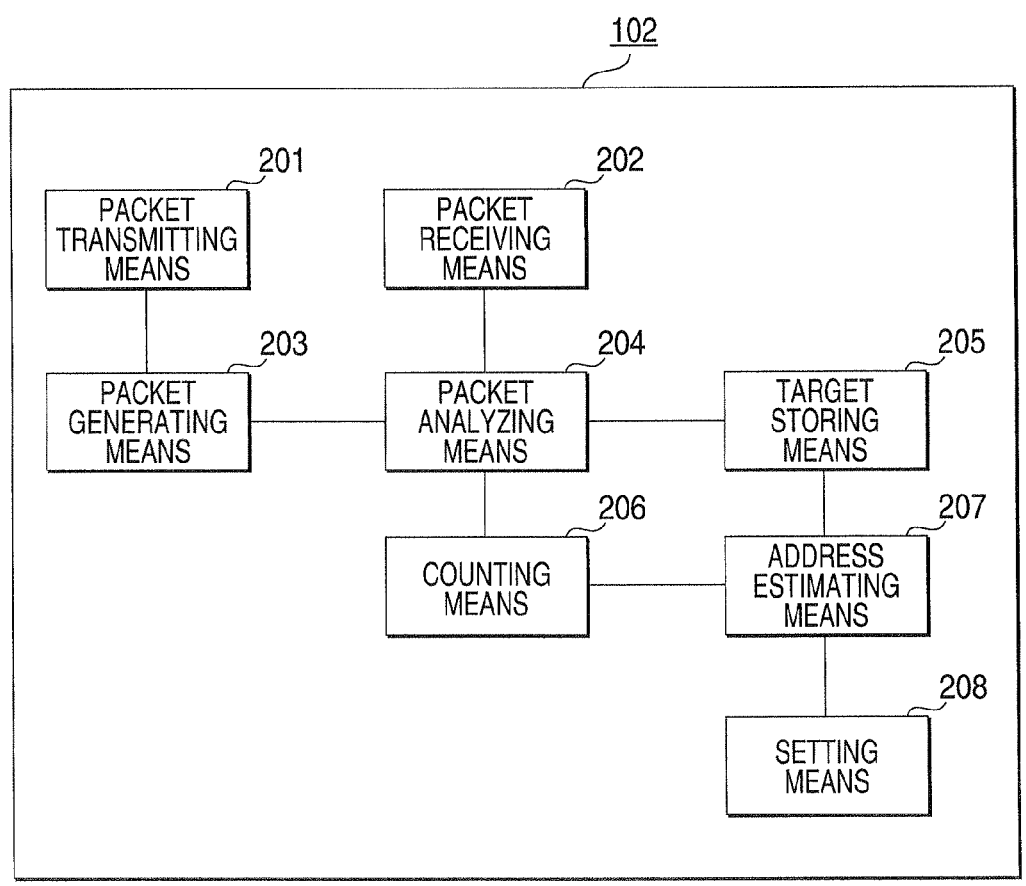
Figure 6:
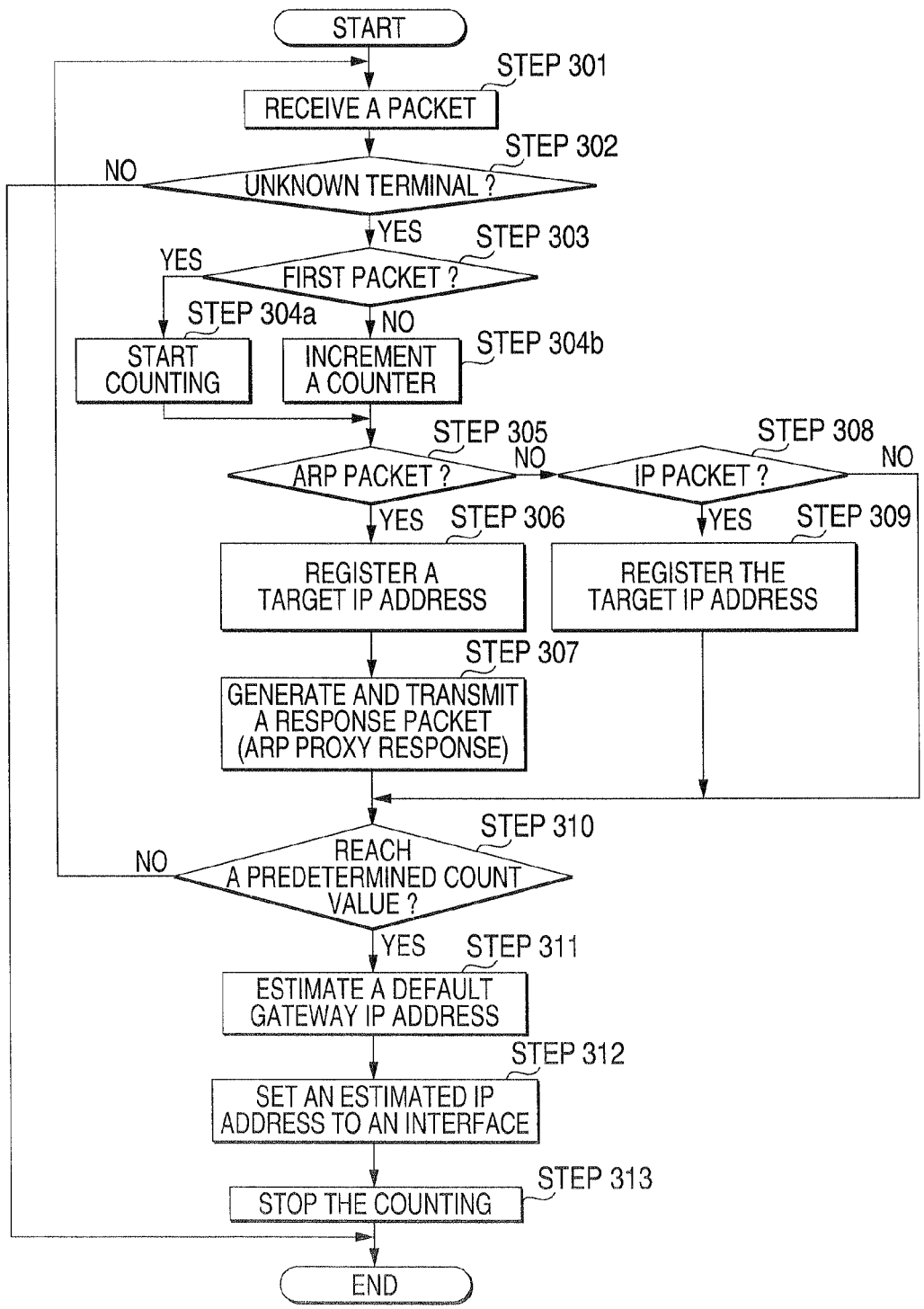
Figure 9:
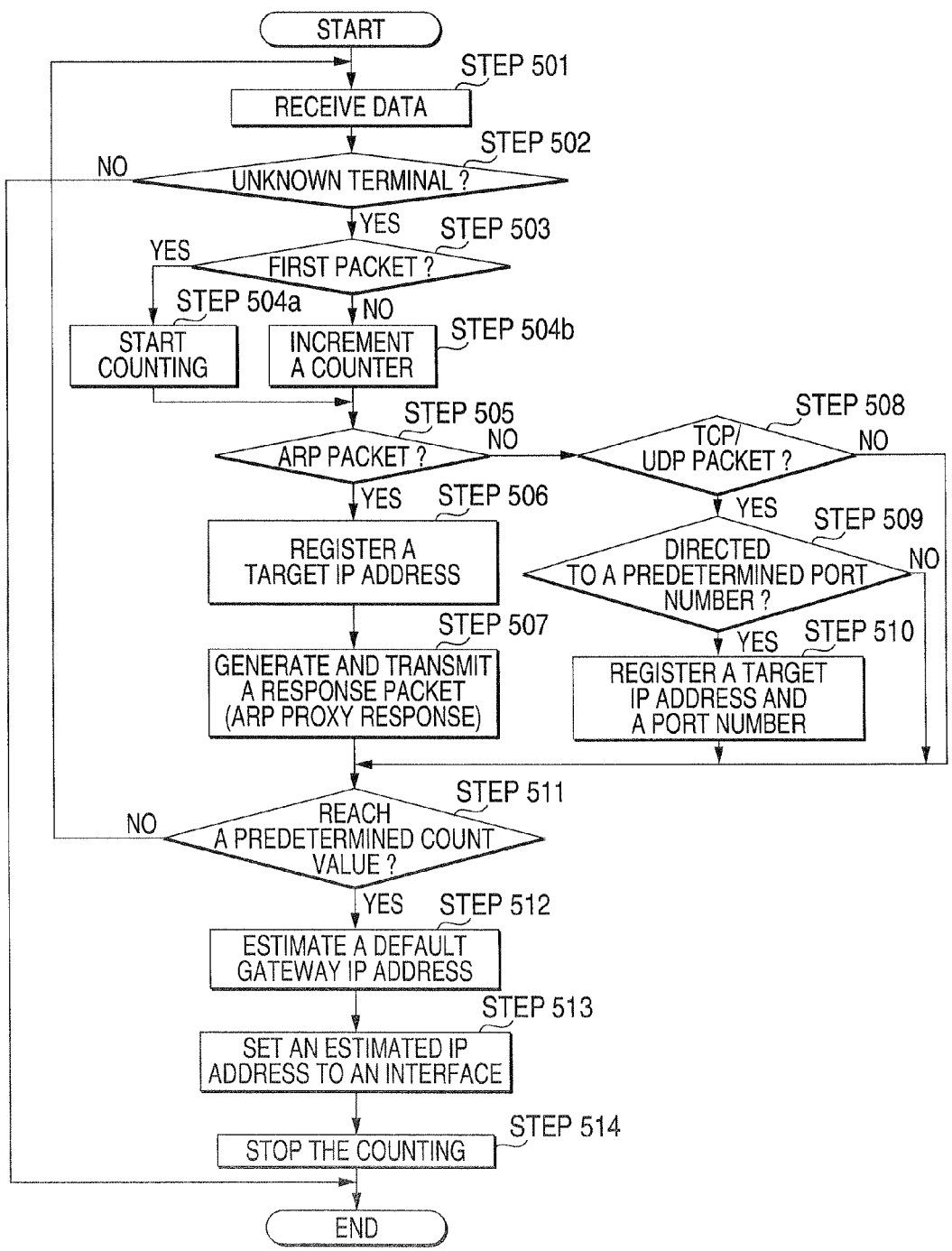
Figure 15:
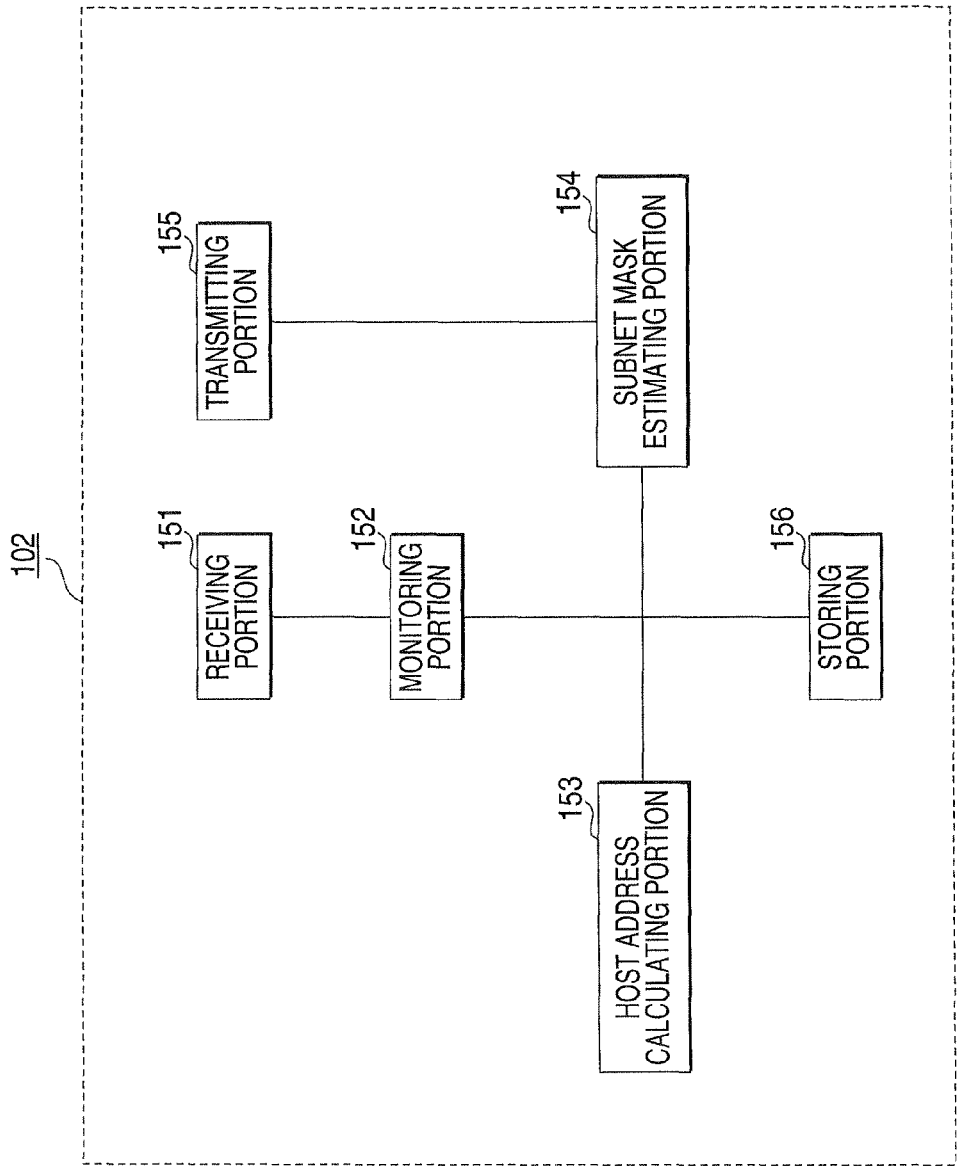
Figure 16:
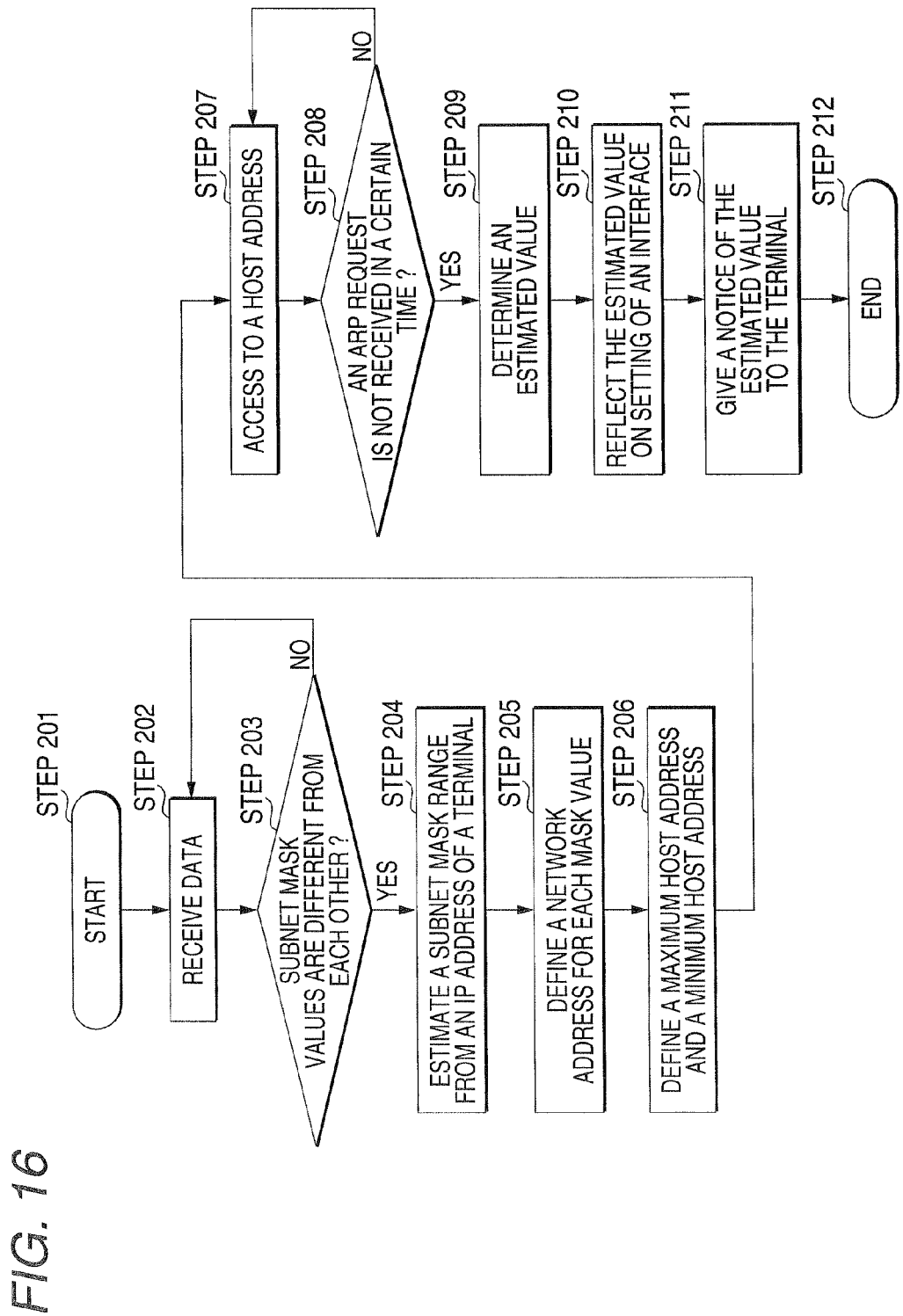
Figure 17:
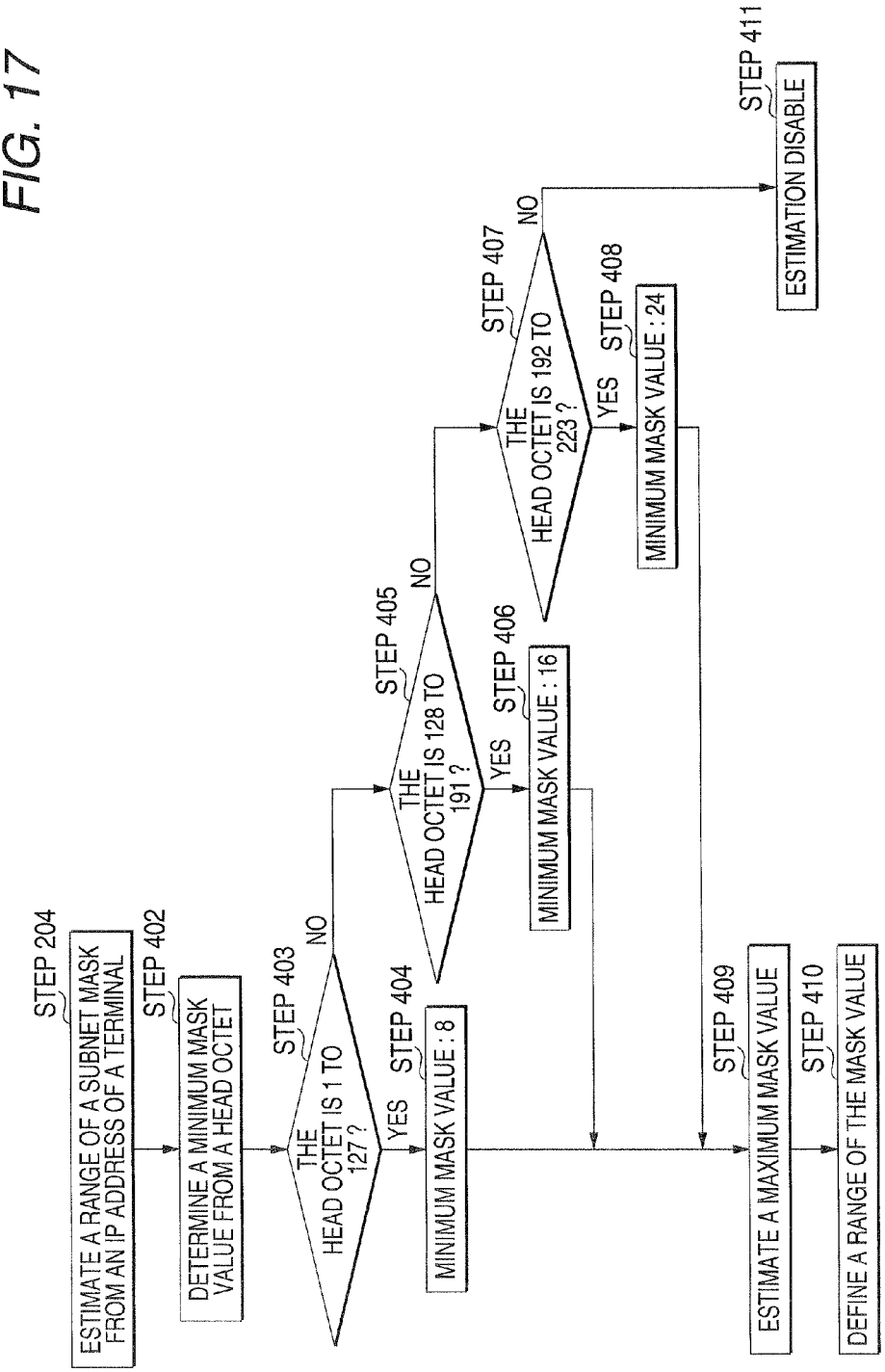
Figure 18:
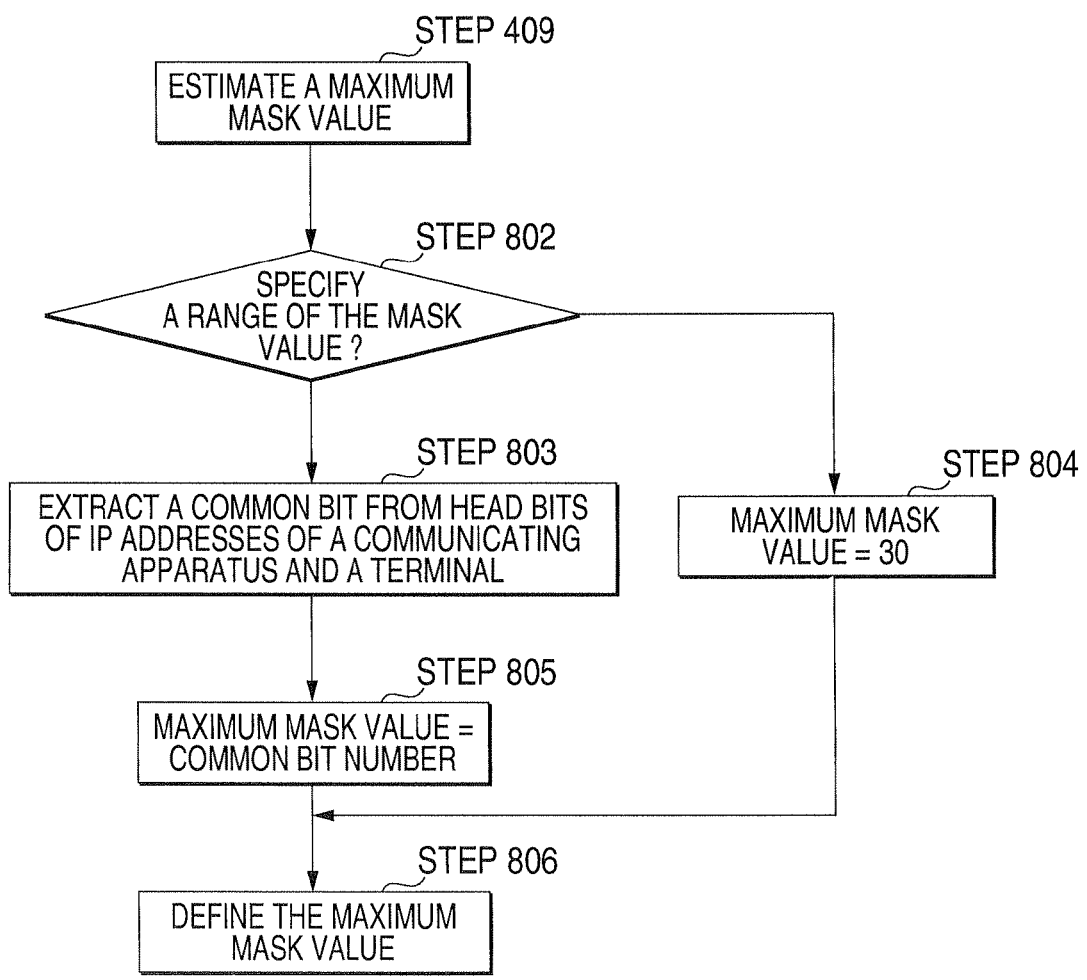
Figure 22:
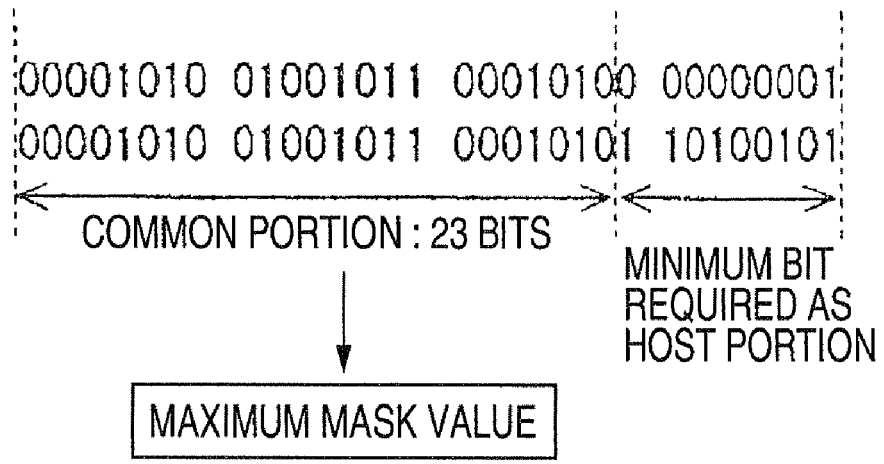

FIG. 1 is a diagram showing a structure of a network system to which a communicating apparatus according to a first embodiment is applied, FIG. 2 is a perspective view showing an outer appearance of the communicating apparatus according to the first embodiment, FIG. 3 is a perspective view showing an outer appearance of the communicating apparatus according to the first embodiment, FIG. 4 is a diagram showing a hardware structure of the communicating apparatus according to the first embodiment, FIG. 5 is a diagram showing a functional structure of the communicating apparatus according to the first embodiment, FIG. 6 is a flowchart showing an operation of the communicating apparatus according to the first embodiment, FIG. 7 is a diagram showing a state of target storing means according to the first embodiment, FIG. 8 is a diagram showing the state of the target storing means according to the first embodiment, FIG. 9 is a flowchart showing an operation of a communicating apparatus according to a second embodiment, FIG. 10 is a diagram showing a port number corresponding to a non-target application according to the second embodiment, FIG. 11 is a diagram showing a state of target storing means according to the second embodiment, FIG. 12 is a diagram showing the state of the target storing means according to the second embodiment, FIG. 13 is a diagram showing the state of the target storing means according to the second embodiment, FIG. 14 is a diagram showing the state of the target storing means according to the second embodiment, FIG. 15 is a diagram showing a functional structure of a communicating apparatus according to a third embodiment, FIG. 16 is a flowchart showing an operation of the communicating apparatus according to the third embodiment, FIG. 17 is a flowchart showing the operation of the communicating apparatus according to the third embodiment, FIG. 18 is a flowchart showing the operation of the communicating apparatus according to the third embodiment, FIG. 19 is a table for a storing portion according to the third embodiment, FIG. 20 is a table for the storing portion according to the third embodiment, FIG. 21 is a table for the storing portion according to the third embodiment, and FIG. 22 is an explanatory diagram related to a maximum mask value according to a fourth embodiment.

DETAILED DESCRIPTION

Each of embodiments according to the invention will be described below. The embodiments can be mutually utilized within a related range.

First Embodiment

FIG. 1 is a diagram showing a structure of a network system to which a communicating apparatus according to a first embodiment is applied.

In FIG. 1, 102 denotes a communicating apparatus such as a router which is provided between different networks and serves to relay a data communication between both of the networks. 101 denotes a second network such as internet which is to be connected to the communicating apparatus 102. 103 denotes a first network such as a local area network (LAN) which is to be connected to the communicating apparatus 102. 104 to 106 denote a terminal which is connected to the first network 103 and serves to access the internet (the second network 101).

The terminals include a terminal 105 for trying to acquire network information of the terminal itself (setting information which is required for a network connection) by using DHCP (Dynamic Host Configuration Protocol), a terminal 106, and a terminal 104 in which network information of the terminal itself is statically preset.

In the first embodiment, description will be given to the respect that the communicating apparatus 102 estimates a default gateway IP address of the terminal 104 based on a packet transmitted from the terminal 104 to which network information is statically set and sets the estimated IP address as an IP address of a network interface of the communicating apparatus 102.

FIGS. 2 and 3 are perspective views showing an outer appearance of the communicating apparatus according to the first embodiment, and FIG. 2 shows a front face and FIG. 3 shows a back face.

The communicating apparatus 102 shown in FIG. 2 is a router. The communicating apparatus 102 has a housing 11, and a display portion 12 such as an LED (Light Emitting Diode) is provided on a front surface of the housing 11.

As shown in FIG. 3, a back face of the housing 11 is provided with a DC (Direct Current) power connector 13, a LAN (Local Area Network) modular jack 14 such as RJ45, and a WAN (Wide Area Network) modular jack 15. A power line 16 such as a parallel cable is connected to the DC power connector 13. An Ethernet cable 17 is connected to the modular jacks 14 and 15.

While the router is illustrated as an example of the communicating apparatus 102, apparatuses having the function of the router (for example, appliances such as a personal computer or a refrigerator) may be used as the communicating apparatus 102.

FIG. 4 is a diagram showing a hardware structure of the communicating apparatus according to the first embodiment.

In FIG. 4, the communicating apparatus 102 has a circuit module 50 in the housing 11 shown in a broken line. A main IC (Integrated Circuit) 51 is mounted on the circuit module 50.

The main IC 51 has a CPU (Central Processing Unit) 51a, a bus such as a main bus 51f and a local bus 51g, a BCU (Bus Control Unit) 51b for controlling a data flow on the bus, MAC blocks (EMAC) 51c and 51d for controlling a MAC (Media Access Control) layer of Ethernet®, and a PCIU 51e for controlling a PCI (Peripheral Components Interconnect) bus.

The CPU 51a and the BCU 51b in the main IC 51 are connected to an SDRAM (Synchronous Dynamic Random Access Memory) 54 and a Flash ROM (Flash Read Only Memory) 55 through the main bus 51f.

Moreover, the CPU 51a and the BCU 51b are connected to an oscillator 52 for supplying a clock to the main IC 51, the display portion 12 such as an LED, and a reset IC 53 for outputting an initializing signal to the main IC 51 through the local bus 51g. The CPU 51a, the BCU 51b, the EMACs 51c and 51d, the PCIU 51e, the oscillator 52, the display portion 12 and the reset IC 53 are connected to the local bus 51g.

The MAC blocks 51c and 51d in the main IC 51 are connected to PHY (PHYsical layer)•ICs 56 and 57 for connecting a physical layer of Ethernet® respectively, and the PHY•ICs 56 and 57 are connected to the LAN modular jack 14 and the WAN modular jack 15 respectively. Moreover, the main IC 51 is connected to the DC power connector 13 through a DC-DC (Direct Current to Direct Current) converter 58. The DC-DC converter 58 converts a DC voltage supplied from the DC power connector 13 into a necessary DC voltage for the main IC 51.

FIG. 5 is a diagram showing a functional structure of the communicating apparatus according to the first embodiment.

As shown in FIG. 5, in the communicating apparatus 102, 202 denotes packet receiving means for receiving a packet from the terminal 104 on the LAN (the first network 103) side, 204 denotes packet analyzing means for analyzing the packet received by the packet receiving means 202, 206 denotes counting means for managing the number of the packets received by the packet receiving means 202, 205 denotes target storing means for storing an IP address (packet information) to be a target indicated by the packet received by the packet receiving means 202, 207 denotes address estimating means for estimating a default gateway IP address based on information of the packet received by the packet receiving means 202, 208 denotes setting means for setting the IP address estimated by the address estimating means 207 to a network interface of the communicating apparatus 102, 203 denotes packet generating means for generating a response to an ARP (Address Resolution Protocol) request packet received from the terminal 104, and 201 denotes packet transmitting means for transmitting a packet generated by the packet generating means 203.

Description will be given to a relationship between the hardware structure (FIG. 4) and the functional structure (FIG. 5) in the communicating apparatus 102.

In FIGS. 4 and 5, the packet transmitting means 201 is implemented by transmitting the packet constituted on the SDRAM 54 to the LAN side interface through a hardware path including the EMAC 51c, EPHY 56 and the LAN 14 by the CPU 51a.

The packet receiving means 202 is implemented by storing, on the SDRAM 54, the packet received from the LAN side interface through a hardware path including the LAN 14, the EPHY 56 and the EMAC 51 by the CPU 51a.

All of the packet generating means 203, the packet analyzing means 204, the target storing means 205, the counting means 206, the address estimating means 207 and the setting means 208 are implemented by causing the CPU 51a to read and execute various control programs stored in the SDRAM 54 and to store/read data in/from a data storing region of the SDRAM 54 or to analyze the stored data.

While a special apparatus, that is, the router is shown as the communicating apparatus 102 in the first embodiment, various control programs to be executed by the CPU 51a can also be implemented by an execution through a general computer. In that case, the various control programs may be stored in an internal memory such as an ROM or an HDD of a computer or may be stored in media for storing various data such as a CD or a DVD.

FIG. 6 is a flowchart showing an operation of the communicating apparatus according to the first embodiment. Description will be given to a processing to be executed when receiving a packet from the terminal 104 to which network setting information is statically set.

In FIG. 6, when the communicating apparatus 102 and the terminal 104 are connected to each other through a LAN cable and the packet receiving means 202 of the communicating apparatus 102 then receives a packet from the LAN side terminal 104 (Step 301), the packet analyzing means 204 checks and stores a transmission source IP address of the packet which is received (Step 302).

If the transmission source IP address checked at the Step 302 is not an IP address distributed by DHCP but an IP address which has not been received by the received packet, the packet analyzing means 204 decides that the terminal 104 to be the transmission source of the packet is an unknown terminal (the terminal 104 in which network information is unknown).

At this time, the terminal 104 may be promoted to access a predetermined external address which is present in the second network 101 in order to transmit as many default gateway directed packets as possible through the unknown terminal 104 with a processing executed by the CPU 51a of the communicating apparatus 102. An unknown terminal indicates a terminal which does not use an IP address assigned by the communicating apparatus 102, and an unknown received packet indicates a packet which is generated from the unknown terminal.

If the packet received by the communicating apparatus 102 is not generated from the unknown terminal 104 at the Step 302, a processing for the packet is ended.

If the packet received by the communicating apparatus 102 is generated from the unknown terminal 104 at the Step 302, the packet analyzing means 204 decides whether the received packet is a first packet transmitted from the terminal 104 or not (Step 303).

If the received packet is the first packet sent from the transmission source IP address at the Step 303, the counting means 206 writes the purport to the SDRAM 54 in order to start to count the packet from the transmission source IP address (Step 304a).

The processing of counting the packets by the counting means 206 sets a threshold for determining the number of packets to be received in order to estimate the default gateway IP address. If it is decided that the packet is not the first packet at the Step 303, the counter information of the SDRAM 54 is updated in order to increment a counter by one every receipt of the packet (Step 304b). The receipt of the packet and the analysis of the received packet are continuously carried out until a predetermined count value is reached.

Next, the packet analyzing means 204 decides whether the packet received from the terminal 104 is an ARP packet based on header information of the received packet (Step 305).

If the packet received from the terminal 104 is the ARP packet at the Step 305, a target IP address in the ARP packet (an IP address of the terminal 104 to know a hardware address of the communicating apparatus 102 in an ARP protocol) is registered in the target storing means 205 (Step 306). When the target IP address in the ARP packet is to be registered in the target storing means 205, an ARP receiving flag of the target storing means 205 is turned ON in order to indicate that the packet sent from the terminal 104 is received as the target IP address of the ARP packet.

In order to receive succeeding packets, an ARP proxy response packet for setting a hardware address to the communicating apparatus 102 is transmitted to the terminal 104 (Step 307). The packet generating means 203 generates the ARP proxy response packet and the packet transmitting means 201 transmits the ARP proxy response packet thus generated to the terminal 104.

Then, the packet of the unknown terminal 104 may be set to be transferred to the second network 101 by proxy or routing through the processing of the CPU 51a of the communicating apparatus 102 until the default gateway IP address can be estimated. In this case, when the default gateway IP address is defined, the communicating apparatus 102 stops the transfer of the packet from the unknown terminal 104 through the proxy or the routing.

On the other hand, if the packet received from the terminal 104 is not the ARP packet at the Step 305, the packet analyzing means 204 decides whether the packet received from the terminal 104 is the IP packet or not (Step 308).

If the packet received from the terminal 104 is the IP packet at the Step 308, a destination IP address is registered in the target storing means 205 (Step 309). At this time, a destination IP address flag of the target storing means 205 is turned ON in order to indicate that the IP address is used as the destination IP address.

An entry of the IP address in the target storing means 205 is created when the packet arrives irrespective of the order of arrival of a packet having an IP address set to the ARP target IP address and a packet having an IP address set to the destination IP address. Then, a flag corresponding to the packet arriving earlier (the ARP receiving flag or the destination IP address flag) is turned ON. When another type of packet arrives, thereafter, the entry of the IP address has been present and only the flag arriving earlier is turned ON in the state of the flag. Therefore, the other flag is operated (ON) additionally.

For example, in the case in which the packet having the IP address set to the destination IP address arrives earlier, the destination IP address flag in the entry of the IP address in the target storing means 205 is turned ON. When the packet having the IP address set to the ARP target IP address arrives, thereafter, the ARP receiving flag is set to the entry of the IP address in the target storing means 205.

After the processings of the Steps 307 and 309, the counting means 206 ascertains whether the packet receiving counter reaches a predetermined value or not (Step 310). The predetermined value of the counter implies a predetermined number of times.

If the packet receiving counter of the counting means 206 does not reach the predetermined value, the packet receipt and the subsequent processings (Steps 301 to 310) are repeated until the packet receiving counter reaches the predetermined value.

When the packet receiving counter reaches the predetermined value, the address estimating means 207 carries out a processing of estimating the default gateway IP address of the terminal 104 by using information registered in the target storing means 205 (Step 311).

FIGS. 7 and 8 are diagrams showing the state of the target storing means according to the first embodiment, illustrating the information registered in the target storing means 205 at time of the Step 311.

In FIG. 7, an entry of an IP address of "10.2.2.1" indicates that the packet sent from the terminal 104 is received as a target IP address of an ARP request packet (the ARP receiving flag is ON), and indicates that the packet set as the destination IP address is not received (the destination IP address flag is OFF).

Moreover, an entry of an IP address of "10.2.2.12" indicates that the packet sent from the terminal 104 is received as the target IP address of the ARP request packet, and indicates that the packet set as the destination IP address is received.

Furthermore, an entry of an IP address of "210.1.2.3" indicates that the packet sent from the terminal 104 is not received as the target IP address of the ARP request packet, and indicates that only the packet set as the destination IP address is received.

The packet analyzing means 204 selects (estimates), as a candidate for the default gateway IP address, an entry in which the ARP receiving flag is ON and the destination IP address flag is OFF. This is based on the fact that the IP packet is rarely transmitted directly from the terminal 104 to the default gateway and the default gateway appears as the destination IP address with difficulty.

In the case shown in FIG. 7, the IP address of "10.2.2.1" is selected as the candidate for the default gateway IP address.

The setting means 208 carries out a processing of rewriting information about the IP address corresponding to the LAN modular jack 14 which is stored in the SDRAM 54 in order to set the IP address selected by the packet analyzing means 204 as an IP address of the LAN side network interface of the communicating apparatus 102 (Step 312). Then, the counting means 206 stops the count processing for the packet sent from the transmission source IP address (Step 313).

Subsequently, the communicating apparatus 102 can receive and relay the packet directed to the default gateway IP address from the terminal 104. Therefore, it is sufficient that only a processing of the default gateway is carried out, and the communicating apparatus 102 can receive only a packet which is to be originally received and relayed.

As described above, according to the first embodiment, when the (unknown) terminal 104 having static network information set is connected to the communicating apparatus 102 and the network is started, the default gateway IP address of the terminal 104 can be estimated and set as an IP address of a network interface of the communicating apparatus 102. Accordingly, the terminal 104 can utilize the communicating apparatus 102 as a default gateway on the network 103 without changing the network setting on the terminal 104 side. The communicating apparatus 102 can efficiently transfer the packet without receiving an unnecessary packet from the terminal 104.

While the condition for starting the packet analysis is set based on the count in the first embodiment, it is not restricted to the setting condition. More specifically, the condition for starting the packet analysis may be set based on an elapsed time after the receipt of a first packet from the terminal 104 or the condition for starting the packet analysis may be set based on a combination of the number of packets and the elapsed time.

In the first embodiment, moreover, the default gateway IP address is estimated on the condition of the entry in which the ARP receiving flag is ON and the destination IP address flag is OFF. As a result, in the case in which there is a plurality of IP addresses for a candidate (for example, the case in FIG. 8), a condition that a peculiar IP address to be often used as a gateway (for example, the least significant byte of the IP address has a minimum value of 1 or a maximum value of 254) may be added to estimate the default gateway IP address and to limit the candidate for the default gateway IP address. Also in this case, it is possible to obtain the same advantages as those in the case in which the default gateway IP address is estimated on the condition of an entry in which the ARP receiving flag is ON and the destination IP address flag is OFF (the case shown in FIG. 7).

In the case in which there is a plurality of candidates for the default gateway IP address, moreover, it is also possible to obtain the same advantages as those in the case in which a candidate for the default gateway IP address is set to the network interface of the communicating apparatus 102 by setting all of the candidates to the network interface of the communicating apparatus 102 through the setting means 208.

Furthermore, the default gateway IP address recognized by the communicating apparatus 102 may be given to a user (the terminal 104) through a WEB screen by the WEB server function provided in the communicating apparatus 102 in such a manner that the user of the terminal 104 can confirm the default gateway IP address recognized and set by the communicating apparatus 102.

Second Embodiment

A second embodiment will be described below.

A structure of a communicating apparatus 102 is the same as that in the first embodiment.

FIG. 9 is a flowchart showing an operation of the communicating apparatus according to the second embodiment of the invention.

In FIG. 9, Steps 501 to 507 are the same as the Steps 301 to 307 shown in FIG. 6, and therefore, description will be omitted.

If a packet received from a terminal 104 is not an ARP packet at Step 505 (Step 505, No), packet analyzing means 204 decides whether the packet received from the terminal 104 is a TCP packet or a UDP packet (Step 508).

If the packet received from the terminal 104 is the TCP packet or the UDP packet, the packet analyzing means 204 decides whether a destination port number is a port number for a predetermined application (Step 509). The predetermined application assumes an application which is not operated in a default gateway, for example, and a packet directed to the application is not a target of a default gateway IP address estimation.

FIG. 10 is a diagram showing a port number corresponding to an application to be a non-target according to the second embodiment of the invention. In the second embodiment, as shown in FIG. 10, a protocol and a port number for the application are used.

If the received packet is possessed by the predetermined application shown in FIG. 10, the packet analyzing means 204 registers a destination IP address and a port number for the packet in target storing means 205 (Step 510).

After the processings of the Steps 507 and 510, counting means 206 ascertains whether a packet receiving counter reaches a predetermined value or not (Step 511).

If the packet receiving counter does not reach the predetermined value, the counting means 206 repeats the packet receipt and subsequent processings (Steps 501 to 511) until the packet receiving counter reaches the predetermined value.

When the packet receiving counter reaches the predetermined value, address estimating means 207 carries out a processing of estimating a default gateway IP address of the terminal 104 by using information registered in the target storing means 205 (Step 512).

FIGS. 11 to 14 are diagrams showing a state of the target storing means according to the second embodiment of the invention, illustrating information registered in the target storing means 205 at Step 512.

In FIG. 11, an entry of an IP address of "10.2.2.1" indicates that the packet sent from the terminal 104 is received as a target IP address of an ARP request packet (an ARP receiving flag is ON), and indicates that a TCP packet and a UDP packet are not then received (no registration in the port number).

Moreover, an entry of an IP address of "10.2.2.12" indicates that the packet sent from the terminal 104 is received as the target IP address of the ARP request packet, and indicates that a packet directed to a port number "53" representing a packet of a DNS (Domain Name System) protocol is received.

Furthermore, an entry of an IP address of "210.1.2.3" indicates that the packet sent from the terminal 104 is not received as the target IP address of the ARP request packet, and indicates that a packet of "80" (HTTP) is received as a destination port number.

In the embodiment, there has been described an example in which the packet analyzing means 204 selects (estimates), as a candidate for the default gateway IP address, an entry in which the ARP receiving flag is ON and the application indicative of the communication directed to the IP address is not specified.

This is an estimation which pays attention to the fact that a specific service is rarely carried out in the default gateway. In the method according to the first embodiment, in the case of FIG. 11, the IP address of "10.2.2.1" is selected as the candidate for the default gateway IP address.

In order to set the IP address selected by the packet analyzing means 204 as an IP address of a network interface, setting means 208 of the communicating apparatus 102 carries out a processing of rewriting information about the IP address corresponding to a LAN modular jack 14 which is stored in an SDRAM 54 (Step 513). Then, counting means 206 stops the counting of the packet sent from a transmission source IP address (Step 514).

In the case in which the terminal 104 to which the IP address is statically set is connected to the communicating apparatus 102 or the case in which the communicating apparatus 102 is connected to a network which is being operated, consequently, a user can carry out a network connection without performing the network setting of the communicating apparatus 102 manually.

As described above, according to the second embodiment, the default gateway IP address of the terminal 104 to which the IP address is statically set is estimated and is set as the network interface IP address of the communicating apparatus 102. Consequently, the communicating apparatus 102 functions as a default gateway of the terminal 104 in the network 103 and can efficiently transfer a packet without receiving an unnecessary packet from the terminal 104.

In the second embodiment, an IP address in which a destination of a received packet is directed to a port number indicative of a predetermined service is excluded as one of conditions for estimating the default gateway IP address. To the contrary, for example, in the case in which a packet of a protocol indicative of a predetermined service which includes a packet to be transmitted to only the default gateway can be detected (which can be discriminated based on the fact that the port number is 1900 in a packet for searching a gateway of UPnP (Universal Plug and Play) protocol, for example) as shown in FIG. 12, it is possible to obtain the same advantages as those in the case in which the IP address in which a destination of a received packet is directed to a port number indicative of a predetermined service is excluded by estimating that "10.2.2.1" to be a destination IP address, for example, is the IP address of the default gateway.

In the second embodiment, moreover, the default gateway IP address is estimated. As a result, the candidate for the default gateway IP address can be limited to one. In the case in which the IP address to be the candidate is not present as shown in FIG. 13, it is also possible to add, as a condition for selecting the candidate, an IP address having a port number of an application to which a service is often given in the default gateway. For example, a DNS service is proxy in the gateway and is thus applied in many cases, which is discriminated according to the fact that the destination port number of the packet is "53". By selecting the destination IP address of "10.2.2.1", it is possible to obtain the same advantages as those in the case in which the candidate for the default gateway IP address is limited to one.

In some cases in which the estimation processing is carried out by the address estimating means 207 according to the second embodiment as shown in the state of the target storing means 205 in FIG. 14, furthermore, there is a plurality of IP addresses to be the candidate for the default gateway. In these cases, it is also possible to add a condition for selecting a peculiar IP address to be often used as the gateway (for example, the least significant byte of the IP address has a minimum value of 1 or a maximum value of 254), thereby estimating the default gateway IP address. By limiting the candidate for the default gateway IP address to "10.2.2.1", for example, it is possible to obtain the same advantages as those in the case in which there is only one IP address to be the candidate for the default gateway.

Third Embodiment

A third embodiment will be described below.

In a communicating apparatus such as a router, usually, at least an IP address and a subnet mask are required when a network is started. In some cases, an IP address, a default gateway IP address or a subnet mask is statically set to a terminal to be connected to the network irrespective of setting of communicating equipment.

In some cases in which such a terminal is connected to the communicating apparatus, a communication cannot be carried out due to the fact that a subnet mask set to the communicating apparatus is different from a subnet mask set to the terminal.

In such a situation, generally, it is necessary to carry out an operation for causing a user to adapt one of the communicating apparatus and the terminal to the setting of the other, and a high knowledge related to the setting of the network is required so that the work is very difficult for some users.

As a method of causing the communicating apparatus to know a value of the subnet mask of the terminal, moreover, it is possible to propose the use of an address mask request of a Type 17 of ICMP (Internet Control Message Protocol) described in RFC (Request For Comment) 950. In JP-T-2005-513832 publication, for example, the method is applied to a router and the router transmits an ICMP address mask request to a terminal to acquire a necessary parameter for a connection from the terminal to a network. Depending on OS (Operating System) loaded onto the terminal, there is carried out setting which does not respond to the ICMP request. The subnet mask value cannot be always acquired without troubling the user.

A structure of a network system applying the communicating apparatus 102 according to the third embodiment is the same as that shown in FIG. 1 according to the first embodiment.

Moreover, a hardware structure of the communicating apparatus 102 is also the same as that shown in FIGS. 2 to 4 according to the first embodiment, and description will be omitted.

FIG. 15 is a diagram showing a functional structure of a communicating apparatus according to the third embodiment of the invention.

In FIG. 15, 151 denotes a receiving portion for receiving a packet from the terminal 104. 152 denotes a monitoring portion for trying a communication with the terminal 104 based on address information of the received packet and deciding whether a subnet mask value set to the communicating apparatus 102 is identical to a subnet mask value set statically to the terminal 104 or not according to whether the communication can be carried out or not.

153 denotes a host address calculating portion for calculating a candidate for the subnet mask value of the terminal 104 and calculating IP addresses (host addresses) of maximum and minimum hosts for accessing each candidate for the subnet mask value from the terminal 104 in order to estimate the subnet mask value set statically to the terminal 104 in the case in which the subnet mask values set statically to the communicating apparatus 102 and the terminal 104 are different from each other.

154 denotes a subnet mask estimating portion for monitoring an ARP request transmitted from the terminal 104 when access is given to a host address created by the host address calculating portion 153 from the terminal 104 and estimating a subnet mask value set statically to the terminal 104 based on information thus monitored, thereby reflecting the subnet mask value on the setting of the communicating apparatus 102.

155 denotes a transmitting portion for transmitting a packet from the communicating apparatus 102 to the terminal 104, that is, giving a notice of the estimated subnet mask to the network equipment. 156 denotes a storing portion for storing data to be processed.

Description will be given to a corresponding relationship between the hardware structure (FIG. 4) and the functional structure (FIG. 15) of the communicating apparatus 102.

In FIGS. 4 and 15, the receiving portion 151 is implemented by storing, on the SDRAM 54, a packet received through a hardware path including the LAN modular jack 14, the EPHY 56 and the EMAC 51c by the CPU 51a.

The transmitting portion 155 is implemented by transmitting the packet constituted on the SDRAM 54 through the hardware path including the EMAC 51c, the EPHY 56 and the LAN modular jack 14 by the CPU 51a.

All of the monitoring portion 152, the host address calculating portion 153, the subnet mask estimating portion 154 and the storing portion 156 are implemented by causing the CPU 51a to read and execute various control programs stored in the SDRAM 54 and storing/reading data in/from the data storing region of the SDRAM 54 or analyzing the stored data.

In the third embodiment, the various control programs to be executed by the CPU 51a can also be utilized in a general computer in the same manner as in the first embodiment.

Description will be given to an operation of the communicating apparatus having the structure described above.

FIG. 16 is a flowchart showing the operation of the communicating apparatus according to the third embodiment, illustrating the operation in which the communicating apparatus 102 estimates the subnet mask value of the terminal 104.

In FIG. 16, at the same time that the communicating apparatus 102 is started, the flow is started at Step 201.

At Step 202, the processing stands by until a packet is transmitted from the terminal 104. Upon receipt of the packet, an IP address of the terminal 104 is acquired from information about the packet.

In the LAN interface 14 of the communicating apparatus 102, it is desirable to acquire information set statically to the terminal 104 and to assign a default gateway IP address of the terminal 104 as described in the first and second embodiments. In the case of the third embodiment, the default gateway IP address may be set by other well-known methods. The third embodiment is effective in that it is possible to correct the setting errors of the subnet mask value which are made by the user also in the case in which the user sets the network manually.

Moreover, the following method may be used.

It is assumed that the receiving portion 151 of the communicating apparatus 102 has a DNS (Domain Name System) server function and a WEB server function and a user connects, to the communicating apparatus 102, the terminal 104 to which static network information is set irrespective of the communicating apparatus 102 to be connected.

At this time, the user of the terminal 104 accesses contents on a WEB server of the communicating apparatus 102 based on a domain name when knowing that the connection to the network cannot be carried out.

The receiving portion 151 acquires information about an IP address set statically to the terminal 104 or an IP address of the default gateway from a packet transmitted at this time. The receiving portion 151 sets the IP address of the communicating apparatus 102 to the address of the default gateway set to the terminal 104 based on the information about the packet received at Step 202.

At Step 203, the monitoring portion 152 uses, as network information, the IP address of the terminal 104 acquired at the Step 202 and a subnet mask value which is preset to the communicating apparatus 102, and tries a communication with the terminal 104. If the communication can be carried out, it is decided that the subnet mask values in the communicating apparatus 102 and the terminal 104 are coincident with each other and the processing is brought into the standby state again at the Step 202.

To the contrary, if the communication cannot be carried out, it is decided that the subnet mask values in the communicating apparatus 102 and the terminal 104 are not coincident with each other and the processing of the host address calculating portion 153 is started.

For easy understanding of the description, a specific example will be employed.

It is assumed that an IP address set to the terminal 104 is 10.75.21.165, a subnet mask is 255.255.254.0, an IP address of a default gateway is 10.75.20.1, and an IP address of the communicating apparatus 102 is 10.75.20.1 (an IP address obtained after an adaptation to an IP address of the default gateway of the terminal 104).

In the stage of the Step 202, the communicating apparatus 102 can acquire the information about the IP address set to the terminal 104 or the IP address of the default gateway and cannot acquire the subnet mask value.

Therefore, a list for the number of used bits of the subnet mask value and a network address candidate shown in FIG. 19 is created from the IP address of the terminal 104 which is acquired at the Step 202, and is registered in the storing portion 156. The state will be described below.

At Step 204, the host address calculating portion 153 obtains a range of the subnet mask value which can be taken by the terminal 104 from the IP address of the terminal 104 acquired at the Step 202. FIG. 17 shows a routine for estimating the range of the subnet mask value.

As shown in FIG. 17, at Steps 403, 405 and 407, the host address calculating portion 153 carries out a case division based on head octet data in the IP address of the terminal 104. In the case in which the head octet data are 1 to 127, a decision of a class A is made and the processing proceeds to Step 404 in which a minimum mask value (a minimum number of bits of the subnet mask) is set to be 8 bits.

In the case in which the head octet data are 128 to 191, a decision of a class B is made and the processing proceeds to Step 406 in which a minimum mask value is set to be 16 bits.

In the case in which the head octet data are 192 to 223, a decision of a class C is made and the processing proceeds to Step 408 in which a minimum mask value is set to be 24 bits.

In the case of the specific example, since the head octet data of the IP address is 10, the minimum mask value is 8 bits.

Next, the host address calculating portion 153 obtains a maximum mask value at Step 409.

FIG. 18 shows a routine for estimating the maximum mask value. In the third embodiment, at Step 804, the maximum mask value is assumed to be 30 which is a fixed value. Processings of Steps 803 to 805 will be described in detail in a fourth embodiment.

The reason that the maximum mask value is set to be 30 in the third embodiment is that a host address requires at least two bits in order to constitute a network and is set to be 30 (=32−2).

From the foregoing, in the case of the specific example, the host address calculating portion 153 defines that the range of the number of bits of the subnet mask value is 8 to 30 bits at Step 410 in FIG. 17.

Returning to FIG. 16, at Step 205, the host address calculating portion 153 defines a network address for each number of bits of the subnet mask value within the range defined at the Step 410 as shown in FIG. 19, and defines a host address 1 and a host address 2 as shown in FIG. 19 for each network address and stores them in the storing portion 156.

The host address 1 is obtained by subtracting one from a maximum value of a host address belonging to each network address, that is, an address in which all of bits of the host address portion of the IP address having the network address are F.

The host address 2 is obtained by adding one to a minimum value of a host address belonging to each network address, that is, an address in which all of the bits of the host address portion of the IP address having the network address are zero.

The IP addresses of the communicating apparatus 102 or the terminal 104 are excluded from the list for the host address which is created (FIG. 19), and overlapping addresses are regard as a unity. Consequently, host address candidates shown in (1) to (24) in FIG. 19 are created and registered in the storing portion 156. The state is shown in FIG. 21.

At Step 207, the subnet mask estimating portion 154 carries out a control for giving access in order from (1) for the candidates shown in FIG. 21 through the terminal 104, that is, larger numbers of used bits in the subnet mask value.

As an accessing method, it is possible to propose a method of transferring a script to be automatically executed from the communicating apparatus 102 to the terminal 104 and a method of causing the communicating apparatus 102 to have the WEB server function, setting a link for each candidate through HTML on WEB and causing a user of the terminal 104 to carry out an operation while seeing a screen display, thereby giving access.

In order to give access from greater subnet mask values in descending order, the method executes a processing of carrying out a control through the script, displaying each host address candidate and displaying access order together in the case in which the user is caused to give access.

Moreover, access is given from (1) in which the subnet mask value is great in order to execute the access from the subnet mask value having a higher possibility that an ARP request might be transmitted, to decrease the case in which a time-out for the transmission of the ARP request is waited, and to shorten a time required for an estimation. Furthermore, it is also possible to prevent the ARP request given from the terminal 104 from flowing into an external network.

For example, when access is given to (1) in which the number of used bits in the subnet mask value is 30, the address also belongs to a subnet in which the number of the used bits in the subnet mask value is equal to or smaller than 29. Also in the case in which an actual number of the used bits in the subnet mask which is to be obtained is equal to or greater than 29, the ARP request is transmitted.

To the contrary, when access is first given to (24) (access is given in ascending order from the smaller number of the used bits in the subnet mask value), there is a high possibility that the ARP request might not be transmitted and the time-out is waited in many cases in which the number of the used bits in the subnet mask value is greater than the IP address.

At Step 208, next, the subnet mask estimating portion 154 decides whether or not the IP address of each candidate accessed in order from (1) at the Step 207 ranges within the subnet set to the terminal 104 depending on the presence of a packet arrival of the ARP request.

Apparently, it is decided that the terminal 104 ranges within the subnet to which the host address candidate is statically set through the receipt of the ARP request, that is, the transmission of the ARP request from the terminal 104. It is assumed that the ARP table of the terminal 104 is cleared before the start of the processing. As shown in FIG. 20, the receipt of the ARP request and the IP packet may be held as a list for each host address candidate in the storing portion 156 in the communicating apparatus 102.

In the case of the specific example, as shown in FIG. 21, the ARP request can be transmitted from the terminal 104 and can be received by the communicating apparatus 102 before the candidate (9). In the candidate of (10), the ARP request is not transmitted from the terminal 104. The candidate of (10) gets out of the range of the subnet mask value set to the terminal 104. Therefore, the terminal 104 decides that the candidate is a host which is present in another network and does not transmit the ARP request but tries to access the default gateway.

When the ARP request is not received at the Step 208, the processing proceeds to Step 209. Since the ARP request is finally transmitted together with the host address 1 and the host address 2 by the access of the Step 207 in (9), the subnet mask estimating portion 154 estimates that the number of bits of the mask value in the host address, that is, a 23-bit is the subnet mask value set statically to the terminal 104 in FIG. 20.

In the case in which the larger subnet mask values are accessed in descending order as described above, it is estimated that a value obtained by adding one to the number of the bits of the mask value when the ARP request is not transmitted to the host address is the number of the bits of the mask value which is set statically to the terminal 104.

After the estimation of the mask value at the Step 209, the processing proceeds to Step 210 as shown in FIG. 16. In other words, the access from the terminal 104 in the Step 207 does not need to be given to the candidate (10) and succeeding candidates.

The subnet mask estimating portion 154 rewrites the subnet mask value stored in the SDRAM 54 in order to reflect the subnet mask value thus estimated on the network setting of the communicating apparatus 102 in the Step 210. Consequently, it is possible to avoid communication troubles caused by the subnet mask value and to carry out a communication without changing the setting of the terminal 104.

At Step 211, the transmitting portion 105 gives a notice of the estimated subnet mask value to the terminal 104. Consequently, the user of the terminal 104 can confirm that the network setting of the communicating apparatus 102 is ended and the communication can be carried out.

In the case in which the estimation of the subnet mask value is unsuccessful, the mask value is decided to be 8 bits, 16 bits and 24 bits if the head octet data of the IP address of the terminal 104 acquired in the communicating apparatus 102 are 1 to 127, 128 to 191, and 192 to 223, respectively. They are set to be the estimated values.

In the third embodiment, the processing of the Step 207 is carried out from the host address having the greater subnet mask value, that is, in order from (1) of FIG. 21. Even if the processing of the Step 207 is carried out in order from the host address having the smaller subnet mask value, however, it is possible to estimate the subnet mask value.

In the case in which random access is given irrespective of the subnet mask value and the mask value which cannot receive the ARP request is detected, moreover, the subnet mask values before and after the mask value may be checked to search for a boundary between the mask value which can receive the ARP request and the mask value which cannot receive the ARP request.

If there is one candidate for the subnet mask value calculated at the Step 204, moreover, the host address calculating portion 153 does not execute the processings of the Steps 205 to 209 but may execute Step 210 and succeeding Steps.

When a terminal in the network 103 which is to be connected to the communicating apparatus 102 is subjected to the same setting as the network setting of the terminal 104, the other terminals can also communicate with the communicating apparatus 102 by the processings carried out for the terminal 104.

In the case in which the terminal in the network 103 which is to be connected to the communicating apparatus 102 is different from the terminal 104, furthermore, another virtual LAN is built for the terminal and the IP address and the subnet mask of the communicating apparatus 102 are set to respective virtual LANs in the same procedure as that for the terminal 104.

As described above, according to the third embodiment, the communicating apparatus 102 can estimate the subnet mask value which is statically set to the terminal 104. By reflecting the estimated value on the network setting of the communicating apparatus 102, furthermore, it is possible to carry out the communication of the communicating apparatus 102 and the terminal 104 without changing the static setting of the terminal 104.

Fourth Embodiment

A fourth embodiment according to the invention will be described below.

The fourth embodiment is different from the third embodiment in that the host address calculating portion 153 incorporates a technique for further limiting a maximum mask value in order to obtain the range of a subnet mask from the IP address of the terminal 104 in the Step 204.

Consequently, it is possible to decrease the number of the candidates for the host address calculated by the host address calculating portion 153, and to shorten a time required for estimating the subnet mask set statically to the terminal 104, and furthermore, to decrease the number of packets to be transmitted from the terminal 104 to the network 103 before the completion of an estimation.

It is assumed that the IP address of the communicating apparatus 102 is 10.75.20.1 and the IP address of the terminal 104 is 10.75.21.165 in the same manner as in the third embodiment.

In the fourth embodiment, Steps 803 and 805 are executed in place of Step 804 in FIG. 18.

At the Step 803, the host address calculating portion 153 obtains a common portion from the heads of the IP addresses of the communicating apparatus 102 and the terminal 104 as shown in FIG. 22.

23 bits are common to the two IP addresses. Therefore, it is apparent that at least 9 bits are necessary for a host portion. In other words, a value of 23 bits or less can be estimated as the number of bits of a subnet mask value which is required for constituting a network by the communicating apparatus 102 and the terminal 104.

In the case of the fourth embodiment, consequently, it is possible to exclude some of candidates in FIG. 20 which have a mask value of 24 to 30 bits. In the case in which one mask value is thus calculated, the value is set to be the estimated value.

As described above, according to the fourth embodiment, it is possible to obtain advantages that a time required for estimating the subnet mask value set statically to the terminal 104 can be shortened and packets to be transmitted from the terminal 104 to the network 103 can be decreased by limiting an estimation range of the mask value in order for the communicating apparatus 102 to estimate the subnet mask value set statically to the terminal 104.

This application is based upon and claims the benefit of priority of Japanese Patent Application No. 2006-149 filed on May 30, 2006 and No. 2006-170033 filed on Jun. 20, 2006, the contents of which are incorporated herein by reference in its entirety.

The invention claimed is:

1. A communicating apparatus for relaying a data communication between a first network and a second network, comprising:
a receiving unit having an interface for a first network connection and serving to receive a packet from a terminal connected to the first network; and
a control processor that acquires an IP address of the terminal from the packet received by the receiving unit, obtains a range of a subnet mask value which can be taken by the terminal based on the IP address, obtains a candidate for a host address corresponding to each subnet mask value, sets the host address candidate accessibly from the terminal, determines an estimated value of the subnet mask value of the terminal based on a state of the packet which is received from the terminal and is transmitted to the host address candidate, and sets the estimated value as a subnet mask value corresponding to an interface for the first network connection.

2. The communicating apparatus according to claim 1, wherein the candidate for the host address corresponding to the subnet mask value is set to be maximum and minimum host addresses belonging to a network address defined by the subnet mask value.

3. The communicating apparatus according to claim 1, wherein the state of the packet which is received from the terminal and is transmitted to the host address candidate is checked for presence of a transmission of an ARP request from the terminal.

4. The communicating apparatus according to claim 3, wherein a boundary between a host address in which the ARP request is transmitted and a host address in which the ARP request is not transmitted is obtained and a mask value of the host address in which the ARP request is transmitted is set to be an estimated value.

5. The communicating apparatus according to claim 1, wherein access is given from the larger number of used bits in the subnet mask value when setting is to be carried out accessibly from the terminal to the candidate for the host address corresponding to the subnet mask value.

6. The communicating apparatus according to claim 5, wherein a mask value obtained by adding one to a mask value of the host address in which the ARP request is not transmitted in the host address candidate is set to be an estimated value.

7. The communicating apparatus according to claim 1, wherein when a range of the subnet mask value which can be taken by the terminal is to be obtained, a minimum value is determined based on head octet data of the IP address of the terminal.

8. The communicating apparatus according to claim 1, wherein when a range of the subnet mask value which can be taken by the terminal is to be obtained, a maximum value is set to be 30 bits.

9. The communicating apparatus according to claim 1, wherein when a range of the subnet mask value which can be taken by the terminal is to be obtained, maximum and minimum values are set to be a common bit number from heads of the IP address of the terminal and an IP address set to itself.

10. The communicating apparatus according to claim 1, wherein the candidates for the host address corresponding to the subnet mask value which overlap are excluded, and the host address candidates can be set accessibly from the terminal.

11. The communicating apparatus according to claim 1, wherein any of the candidates for the host address corresponding to the subnet mask value which is coincident with the IP addresses possessed by itself and the terminal is excluded, and the host address candidate can be set accessibly from the terminal.

12. The communicating apparatus according to claim 1, wherein if a range of the subnet mask value which can be taken by the terminal is one, the subnet mask value is set as a subnet mask value corresponding to the interface for the first network connection.

13. The communicating apparatus according to claim 1, wherein if the subnet mask value is not obtained, 8 bits, 16 bits and 24 bits are set to be the subnet mask values corresponding to the interface for the first network connection if head octet data of the IP address of the terminal are 1 to 127, 128 to 191, and 192 to 223, respectively.

14. A method of controlling a communicating apparatus for relaying a data communication between a first network and a second network, comprising the steps of:
receiving a packet from a terminal connected to the first network;
acquiring an IP address of the terminal from the received packet, obtaining a range of a subnet mask value which can be taken by the terminal based on the IP address, and acquiring a candidate for a host address corresponding to each subnet mask value;
setting the host address candidate accessibly from the terminal and determining an estimated value of the subnet mask value of the terminal based on a state of the packet transmitted to the host address candidate sent from the terminal; and
setting the estimated value as a subnet mask value corresponding to an interface for a first network connection.

15. A communication apparatus for relaying a data communication between a first network and a second network, the communication apparatus comprising:
a receiving unit having an interface providing a first network connection and serving to receive a packet from a terminal connected to the interface; and
a control processor that acquires an IP address of the terminal from the packet received by the receiving unit, obtains a number of bits of an estimated subnet mask value of the terminal based on the IP address, defines a host address for the number of bits, sets the host address accessibly from the terminal, determines the estimated subnet mask value of the terminal based on an arrival state of another packet caused to be sent from the terminal in response to the terminal executing access to the set host address and sets the estimated value as a subnet mask value corresponding to the interface for the first network connection.

16. The communicating apparatus according to claim 15, wherein the control processor defines a plurality of host addresses for the number of bits, and thereafter sets the plurality of host addresses accessibly from the terminal, determines the estimated subnet mask value of the terminal based on an arrival state of another packet caused in response that the terminal executing sequential access to the set plurality of host addresses, and sets the estimated value as a subnet mask value corresponding to the interface for the first network connection.

17. A method of controlling a communication apparatus for relaying a data communication between a first network and a second network, the method comprising the steps of:
receiving a packet from a terminal connected to the first network;
acquiring an IP address of the terminal from the packet;
obtaining a candidate for a host address based on the IP address;
setting a candidate accessibly from the terminal;
determining an estimated subnet mask value of the terminal based on a state of another packet caused to be sent from the terminal in response to the terminal executing access to a set host address; and
setting the estimated value as a subnet mask value of the terminal corresponding to an interface for the first network connection.

18. A communication apparatus for relaying a data communication between a first network and a second network, the communication apparatus comprising:
a receiving unit having an interface providing a first network connection and serving to receive a packet from a terminal connected to the interface; and
a control processor that:
(1) checks a packet from a terminal,
(2) determines a default gateway IP address of the terminal based on the packet,
(3) sets the default gateway IP address as an IP address corresponding to the interface for the first network connection if the packet received by the receiving unit is transmitted from the terminal,
(4) obtains a candidate for a host address based on the IP address,
(5) sets a candidate accessibly from the terminal,
(6) determines an estimated subnet mask value of the terminal based on an arrival state of another packet caused to be sent from the terminal in response to the terminal executing access to a set host address, and
(7) sets the estimated value as a subnet mask value of the terminal corresponding to the interface for the first network connection.

19. The communicating apparatus according to claim 15, wherein the candidate for the host address corresponding to the subnet mask value is set to be maximum and minimum host addresses belonging to a network address defined by the subnet mask value.

20. The communicating apparatus according to claim 15, wherein the state of the packet which is received from the terminal and is transmitted to the host address candidate is checked for presence of a transmission of an ARP request from the terminal.

21. The communicating apparatus according to claim 20, wherein a boundary between a host address in which the ARP request is transmitted and a host address in which the ARP request is not transmitted is obtained and a mask value of the host address in which the ARP request is transmitted is set to be an estimated value.

* * * * *